United States Patent
Herbolzheimer et al.

(10) Patent No.: US 11,607,924 B2
(45) Date of Patent: Mar. 21, 2023

(54) CONTROL SYSTEM FOR A HEATING SYSTEM AND METHOD FOR OPERATING A HEATING SYSTEM

(71) Applicant: Bayerische Motoren Werke Aktiengesellschaft, Munich (DE)

(72) Inventors: Robert Herbolzheimer, Groebenzell (DE); Oliver Horn, Munich (DE); Patrick Oswald, Munich (DE); Markus Stix, Taufkirchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 302 days.

(21) Appl. No.: 16/824,117

(22) Filed: Mar. 19, 2020

(65) Prior Publication Data
US 2020/0298662 A1    Sep. 24, 2020

(30) Foreign Application Priority Data

Mar. 20, 2019    (DE) .................... 10 2019 107 193.3

(51) Int. Cl.
B60H 1/00    (2006.01)

(52) U.S. Cl.
CPC ..... B60H 1/00885 (2013.01); B60H 1/00057 (2013.01); *B60H 2001/0015* (2013.01)

(58) Field of Classification Search
CPC ........... B60H 1/00007; B60H 1/00057; B60H 1/00385; B60H 1/00392; B60H 1/004; B60H 1/00835; B60H 1/00885; B60H 1/00899; B60H 1/3213; B60H 1/3216; B60H 1/32281; B60H 1/00828; B60H 1/00864; B60H 1/00735; B60H 1/00664;
(Continued)

(56) References Cited

U.S. PATENT DOCUMENTS

| 5,549,153 A * | 8/1996 | Baruschke | B60L 58/26 |
| | | | 180/68.5 |
| 10,654,336 B2 * | 5/2020 | Allgaeuer | B60H 1/323 |

(Continued)

FOREIGN PATENT DOCUMENTS

| CN | 108382164 A * | 8/2018 | ......... B60H 1/00278 |
| DE | 10 2015 218 825 A1 | 3/2017 | |

(Continued)

OTHER PUBLICATIONS

WO-2017055017-A1 English Translation (Year: 2017).*

*Primary Examiner* — Jenna M Hopkins
(74) *Attorney, Agent, or Firm* — Crowell & Moring LLP (57) ABSTRACT

A control system and method for a heating system of an electric vehicle or hybrid vehicle is embodied such that when there is a heating request for a passenger compartment of the vehicle, a heating mode is set in order to heat the passenger compartment by heat from a heating circuit. In a mixed mode, an excess heat in the heating circuit is output to the surroundings, or in an excess mode, the excess heat is retained in the heating system, in order to satisfy a heating request. In the mixed mode, a degree of opening of the heating circuit is set such that only a partial quantity of coolant from the heating circuit is exchanged with a cooling circuit. The mixed mode is activated if the excess heat in the heating circuit exceeds a threshold value which is determined in accordance with an external temperature.

14 Claims, 3 Drawing Sheets

(58) Field of Classification Search
CPC .. B60H 2001/0015; B60H 2001/00928; B60H 2001/00949; B60H 2001/3238; B60H 2001/3255
See application file for complete search history.

(56) References Cited

U.S. PATENT DOCUMENTS

| | | | |
|---|---|---|---|
| 10,773,570 B2* | 9/2020 | Herbolzheimer | F25B 13/00 |
| 11,433,735 B2* | 9/2022 | Allgaeuer | B60H 1/00385 |
| 2011/0061405 A1* | 3/2011 | Watanabe | B60K 11/085 62/133 |
| 2017/0008407 A1* | 1/2017 | Porras | B60L 58/27 |
| 2017/0174038 A1* | 6/2017 | Scheldel | B60H 1/3213 |
| 2018/0134123 A1* | 5/2018 | Herbolzheimer | B60H 1/3213 |
| 2020/0298657 A1* | 9/2020 | Allgaeuer | B60H 1/22 |
| 2020/0298662 A1* | 9/2020 | Herbolzheimer | B60H 1/00899 |

FOREIGN PATENT DOCUMENTS

| | | | | |
|---|---|---|---|---|
| DE | 102015218825 A1 * | 3/2017 | | B60H 1/00007 |
| DE | 102015222267 A1 * | 5/2017 | | B60H 1/00028 |
| ES | 2864713 T3 * | 10/2021 | | B60H 1/00271 |
| JP | 2004131033 A * | 4/2004 | | B60H 1/00835 |
| JP | 2011068232 A * | 4/2011 | | |
| KR | 2005105664 A * | 11/2005 | | |
| WO | WO-2008026115 A1 * | 3/2008 | | B60H 1/3216 |
| WO | WO-2017055017 A1 * | 4/2017 | | B60H 1/00007 |
| WO | WO-2018139342 A1 * | 8/2018 | | B60H 1/22 |

* cited by examiner

CONTROL SYSTEM FOR A HEATING SYSTEM AND METHOD FOR OPERATING A HEATING SYSTEM

CROSS REFERENCE TO RELATED APPLICATION

This application claims priority under 35 U.S.C. § 119 from German Patent Application No. 2019 107 193.3, filed Mar. 20, 2019, the entire disclosure of which is herein expressly incorporated by reference.

BACKGROUND AND SUMMARY OF THE INVENTION

The invention relates to a control system for a heating system of an electric vehicle or hybrid vehicle as well as to a method for operating such a heating system by way of such a control system.

A heating system is usually used to control the temperature of various components which are connected to the heating system for this purpose. Specifically in an electric vehicle or hybrid vehicle, such components are a passenger compartment of the vehicle, a high-voltage accumulator of the vehicle and one or more heat sources of an electric drive train of the vehicle, e.g. an electric machine or a power electronics system or the like. In order to carry out various temperature control tasks, the heating system is correspondingly actuated by means of a control system.

A control system for controlling a heat pump system is described, for example, in DE 10 2015 218 825 A1. In this document, various mixed modes are also described as transition modes between a heating mode and a cooling mode. Specifically, a third mixed mode is described in which a heating branch of the heat pump system is operated in a clocked fashion in order to discharge excess heat from the heating branch, via an LT cooler. The clocking is dependent here on the excess heat in the heating branch.

An object of the invention here is to disclose an improved control system for a heating system. Furthermore, an improved method for operating a heating system is to be disclosed. In this context, the intention is to use excess heat, in particular for controlling the temperature of the passenger compartment as efficiently as possible and as far as possible in accordance with demand.

The object is achieved by a control system for a heating system and by a method of operating the heating system via the control system, in accordance with the claimed invention. The statements relating to the control system apply accordingly also to the method, and vice versa.

The control system serves to control and to operate a heating system of an electric vehicle or hybrid vehicle. The control system is embodied in such a way that when there is a heating request for a passenger compartment of the vehicle a heating mode is set in order to heat the passenger compartment by means of heat from a heating circuit of the heating system. The heating system also has a cooling circuit to which a surroundings cooler is connected. The control system is also embodied in such a way that in a mixed mode excess heat in the heating circuit is output to the surroundings via the surroundings cooler in the cooling circuit, or in an excess mode it is retained in the heating system, in order to satisfy a heating request, in particular a future heating request. In a suitable refinement, this excess heat is transferred again into the heating circuit by means of a heat pump of the heating system, and it is used to satisfy a heating request. In the mixed mode, a degree of opening of the heating circuit is set in such a way that only a partial quantity of coolant from the heating circuit is exchanged with the cooling circuit and as a result the excess heat is output to the cooling circuit and preferably also to the surroundings. In contrast, the remaining part of the coolant circulates in the heating circuit and serves, in particular, to heat the passenger compartment. The mixed mode is activated if the excess heat in the heating circuit exceeds a threshold value which is determined in accordance with the external temperature and preferably also in accordance with a heating circuit setpoint temperature. The mixed mode is accordingly activated, in particular, when in the heating mode more heat is present in the heating circuit than is required to heat the passenger compartment.

One advantage of the excess mode is, in particular, that, in contrast to the mixed mode, it permits the excess heat to be retained, so that firstly the heating system does not have to be switched over in order to discharge the heat. In other words, the excess mode allows a certain degree of freedom of maneuver in dealing with heat in the heating system, which freedom of maneuver positively influences the switching behavior of the heating system, since under certain circumstances fewer switching over processes have to be performed. As a result, in particular the service life of the heating system is improved. In addition, the stored heat in the heating circuit is available for a future temperature-control request and is also preferably used for such a request. In this case, it is then not necessary to generate new heat in a costly fashion, as a result of which the heating system is more energy efficient overall. A future heating request is predicted, for example, on the basis of a previous user behavior or on the basis of specific external circumstances such as e.g. the external temperature or the location of the vehicle, and is activated in accordance therewith.

One advantage which is achieved with the invention is, in particular, that excess heat in the heating system is not necessarily automatically discharged but rather is, if appropriate, stored, that is to say is retained in the heating system, specifically in the coolant, in a way which is matched to the situation. This is done here by taking into account the external temperature in the decision as to whether or not the excess heat is discharged, by means of the mixed mode, from the heating circuit to the cooling circuit and from here, in particular, also to the surroundings, and is instead retained in the heating system in the excess mode. This is based on the realization that at different external temperatures there are also different probabilities that in future there will be a heating request for which currently present excess heat is appropriately stored. Depending on the probability of a future heating request, the mixed mode or the excess mode is then activated. Therefore, overall external-temperature-dependent and demand-dependent outputting and storage of the excess heat is implemented. Since in the mixed mode heat is ultimately discharged to the surroundings, but is not in the excess mode, in particular these two operating modes exclude one another. However, the excess mode can be set in parallel with the heating mode.

The heating circuit and the cooling circuit are each part of an overall cooling circuit of the heating system and are connected to one another. For this purpose, the heating circuit is connected to the cooling circuit via a heating circuit feedline and a heating circuit return line. However, in this context the two circuits can be disconnected from one another hydraulically by means of a suitable actuator so that the heating circuit can also be operated separately from the cooling circuit, in particular in the heating mode. In particular, the degree of opening is 0 if the heating circuit is closed, 1 if the heating circuit is completely opened, and between 0 and 1 in the mixed mode. In a suitable refinement, the heating circuit and the cooling circuit are connected to one another by means of a shut-off valve in such a way that they can be disconnected, and the shut-off valve, and the shut-off valve is operated in a clocked fashion in the mixed mode so that the degree of opening of the heating circuit then corresponds to a clock cycle of a clocking sequence of the shut-off valve. In this respect, a refinement as in paragraph [0053] of DE 10 2015 218 825 A1, mentioned at the beginning, is described. A refinement in which the heating circuit and the cooling circuit are connected to one another by means of a proportional valve with an adjustable flow cross section in such a way that they can be disconnected is equivalent to this and also advantageous. The degree of opening of the heating circuit then corresponds to the flow cross section which is set, and the mixed mode is set by virtue of the fact that the flow cross section is set between a minimum flow cross section and a maximum flow cross section. In any case, in the mixed mode the exchange of coolant between the heating circuit and the cooling circuit is limited.

In the heating mode, the heat is output, in particular by means of a heating-type heat exchanger, to air which is fed to the passenger compartment. The heating circuit is expediently shut off here and only opened again when excess heat is present and said heat can be discharged into the cooling circuit in order to be stored there in the excess mode or alternatively be output to the surroundings in the mixed mode or in a cooling mode. In order to store the excess heat in the heating circuit for a future heating request the heating circuit remains shut off.

The mixed mode is activated starting from the heating mode if the threshold value for the excess heat is exceeded. The heating circuit is then partially opened, i.e. the maximum possible degree of opening is not set but rather just part of the heat continues to be used for heating the passenger compartment. However, as a result of the dependence on the external temperature the start of the opening of the heating circuit is shifted under certain circumstances so that in corresponding cases a premature discharge of heat is prevented. Correspondingly, the mixed mode is also prevented with positive consequences for the acoustic behavior and the wear of the heating system. When the excess heat is increased further, in particular a cooling mode is then set automatically and the heating circuit is opened to the maximum degree, i.e. in particular in such a way that all the coolant in the heating circuit continuously flows into the cooling circuit and no portion of coolant remains and is circulated in the heating circuit. The degree of opening is set in accordance with the maximum value.

In order to cool the passenger compartment, when there is a corresponding cooling request, in particular a cooling mode is activated in which heat is extracted from the passenger compartment or from an air flow which is fed to the passenger compartment, by means of an air-conditioning evaporator. The air-conditioning evaporator is connected to a refrigeration circuit of the heating system via which the heat is transferred to a condenser in the heating circuit and is then available there as heating heat, e.g. in the event of demoisturization, or forms a corresponding excess heat which is then discharged into the cooling circuit.

The control system is preferably embodied in such a way that the threshold value becomes lower as the external temperature rises. In addition, the threshold value is also preferably lower as the heating circuit setpoint temperature rises. This is based on the concept that when there are relatively low external temperatures but a heating circuit setpoint temperature which currently has a low setting it is probable that in future there will be a relatively high heating request so that specifically in such cases excess heat is expediently stored, i.e. the excess mode is activated.

The control system is preferably embodied in such a way that in the mixed mode the degree of opening is increased as the excess heat in the heating circuit increases. The more heat is therefore to be discharged, the further the heating circuit is opened. In DE 10 2015 218 825 A1 cited at the beginning, the clock cycle, i.e. generally the degree of opening, in the third mixed mode is set in accordance with the excess heat in the heating circuit, and the activation of the third mixed mode is also tied to the excess heat. The activation of the mixed mode is advantageously coupled here to the external temperature, preferably in combination with the specified dependence of the degree of opening on the magnitude of the excess heat. In the mixed mode the degree of opening of the heating circuit is preferably increased as the excess heat in the heat circuit increases so that when there is a relatively large excess of heat, heat is discharged to a greater extent. On the one hand, the activation of the mixed mode at all and therefore the use of a degree of opening between a minimum value and a maximum value is therefore dependent on the external temperature, and at the same time, on the other hand, the value which is specifically selected and set for the degree of opening is dependent on the excess heat.

The control system is preferably embodied in such a way that the degree of opening is determined as a function of the external temperature and the excess heat on the basis of a characteristic diagram and is, for example, extracted therefrom directly. In one particularly preferred refinement, the excess heat results from a heating circuit setpoint temperature and a heating circuit actual temperature. In this refinement, the control system is then embodied in such a way that the degree of opening is determined as a function of the external temperature, of the heating circuit setpoint temperature and of the heating circuit actual temperature on the basis of a characteristic diagram, and is, for example, directly extracted therefrom. The heating circuit setpoint temperature is set, for example, by the user. The characteristic diagram therefore depends, in accordance with the external temperature and the heating circuit setpoint temperature, which operating mode is set and, in particular, how large the excess of heat is and which degree of opening for the heating circuit is set, that is to say whether the heating circuit is completely opened in the cooling mode or completely closed in the heating mode, or whether it is only partially opened between them in the mixed mode. The excess heat is set by virtue of the fact that in the heating mode the heating circuit remains closed despite excess heat, or that in the cooling mode discharge of heat via the surroundings cooler is prohibited in that said cooler is e.g. shut off on the air side. In this context, similarly to the mixed mode, only partial opening of the heating circuit is also possible when the surroundings cooler is shut off, and said partial opening is set in order to implement an excess mode in which part of the heat from the heating circuit is stored in the cooling circuit, while the rest of the heat in the heating circuit is used to heat the passenger compartment.

The mixed mode is suitably set only when the heating mode is set at the same time as a cooling mode for the passenger compartment or at the same time as an HVAC cooling mode for cooling the high-voltage accumulator. If, on the other hand, the heating mode is set but at the same time a cooling mode or HVAC cooling mode is not set, the mixed mode is, in particular, not required since here the temperature of the coolant in the heating circuit is preferably set by closed loop control of the compressor and therefore because of the principle involved there can be no excess heat.

The control system is preferably embodied in such a way that the excess heat is determined on the basis of a difference between a heating circuit actual temperature of the coolant in the heating circuit and a heating circuit setpoint temperature or corresponds to this difference. However, other parameters are also conceivable and likewise suitable for determining the excess heat. The heating circuit setpoint temperature is predefined, in particular, by the user or by another control system of the vehicle or by an air-conditioning logic which is superordinate to the control system. The heating circuit actual temperature is measured by means of a suitable sensor in the heating circuit.

The heat in the heating circuit originates, in addition to the air-conditioning evaporator, in particular from a heat pump of the heating system, which pump has a chiller and a condenser, wherein the condenser is arranged as a heat source in the heating circuit, while the chiller is arranged elsewhere in the overall cooling circuit as a heat sink, and is actually not arranged in the heating circuit. The chiller is preferably connected together with a high-voltage accumulator of the vehicle in an HVAC circuit, which is also part of the overall cooling circuit, but can be respectively expediently disconnected from the heating circuit and from the cooling circuit by means of one or more actuators. The chiller and the condenser are additionally both connected, together with the air-conditioning evaporator, to the refrigeration circuit of the heating system. In a heating pump mode, the chiller takes up heat from the surroundings via the surroundings cooler and transmits said heat into the heating circuit. Alternatively or additionally, the heating pump is also activated beyond the abovementioned heat pump mode in order to take up waste heat from a component which is connected to the overall cooling circuit and transmits said heat into the heating circuit.

The excess mode serves generally to retain heat, and this can be implemented in various ways, as has already been indicated. In one suitable refinement, the control system is embodied in such a way that in the excess mode the excess heat is retained in the heating circuit, in order to satisfy the future heating requirement from the heating circuit. For this purpose, the heating circuit is continuously closed as in the pure heating mode, and the excess heat is stored in the coolant in the heating circuit, usually at a temperature level which is high in comparison with the cooling circuit.

Alternatively or additionally the control system is advantageously embodied in such a way that in the excess mode the excess heat is retained in the cooling circuit, and in order to satisfy a heating request it is transferred from the cooling circuit into the heating circuit by means of the heat pump. In other words, heat is retained, i.e. stored, in the cooling circuit, usually at a temperature level which is low in comparison with the heating circuit. For this purpose, in particular the supply of air from the surroundings to the surroundings cooler is interrupted so that there is no exchange of heat with the surroundings.

The excess heat in the heating circuit is expediently stored on the basis that the heating mode and generally on the basis of a closed heating circuit, so that the degree of opening of the heating circuit firstly does not need to be changed. In contrast, on the basis of the mixed mode or of the cooling mode, that is to say when the heating circuit is already opened, the excess heat is expediently stored in the cooling circuit so that in this case also it is firstly not necessary to switch over the heating circuit.

The control system is preferably embodied in such a way that in the heating mode the heating circuit is opened if the heating circuit setpoint temperature is lower than a coolant actual temperature upstream of the heating circuit. In this context, the heating circuit is, in particular, opened continuously and completely, that is to say not only partially as in the mixed mode. In one preferred refinement, the coolant actual temperature downstream of the surroundings cooler and upstream of the heating circuit is measured, expediently at the heating circuit feedline. Alternatively, the coolant actual temperature is measured upstream of the surroundings cooler. By means of such opening of the heating circuit in the heating mode, in particular an excess mode is set which overwrites a possible mixed mode and instead in which excess mode the heating circuit is continuously opened. Although the opening of the heating circuit corresponds basically to the cooling mode, no outputting of heat occurs in the abovementioned specific temperature situation since the cooling circuit is warmer than the heating circuit. This refinement is based, in particular, on the realization that when the temperature of the coolant in the cooling circuit is higher in comparison with the heating circuit the heating request can also be satisfied with heat from the cooling circuit, and is therefore expediently also satisfied by opening the heating circuit. As a result of the corresponding heat gradient, no heat is then discharged from the heating circuit despite the fact that it is opened, but rather on the contrary heat is discharged into it. The opening of the heating circuit advantageously brings about more stable operation of the heating system. In addition, switching processes are eliminated and therefore the service life of the corresponding valves is improved. Furthermore, the omission of the mixed mode improves the acoustics of the heating system.

The control system is preferably embodied in such a way that if neither the heating mode nor the cooling mode is activated the heating circuit is closed in accordance with a heating circuit actual temperature if the heating circuit actual temperature is higher than the external temperature, and is opened if the heating circuit actual temperature is lower than the external temperature or corresponds thereto. In this context, the heating circuit actual temperature is compared, in particular, with the external temperature. If the heating circuit actual temperature is higher than the external temperature, the heating circuit is preferably closed. This prevents heat from being output to the surroundings and to the cooling circuit, and instead this heat is stored in the heating circuit so that an excess mode is set. If the heating circuit actual temperature is lower than the external temperature or corresponds thereto, in particular within a tolerance, the heating circuit is preferably opened. As a result, in particular it is possible for coolant from the cooling circuit to flow through the heating circuit, and as a result a venting mode is made possible, in particular only when no heat is lost to the surroundings in this context.

The surroundings cooler is preferably assigned a fan set with an adjustable fan rotational speed. As a result, the exchange of heat with the surroundings is advantageously set in accordance with demand and is adapted to the respectively present situation, in particular to the temperature conditions in the cooling circuit. In this context, the exchange of heat is decisively determined by a throughput of air of the surroundings cooler. The throughput of air is then controlled by setting the fan rotational speed. The fan is, in particular, an electrically driven fan. In one advantageous embodiment the control system is embodied in such a way that in the heating mode the fan rotational speed of the fan is set in accordance with a coolant actual temperature and a minimum coolant temperature, and that in the cooling mode the fan rotational speed of the fan is set in accordance with the coolant actual temperature. The minimum coolant temperature indicates a lower limiting value which prevents the coolant in the surroundings cooler from being cooled to such an extent that it freezes up in the winter. For this purpose, the minimum coolant temperature is determined, for example, in accordance with the external temperature by means of a characteristic diagram, and, in particular, in such a way that the minimum coolant temperature is at most slightly lower than the dew point of the surrounding air in the current situation. The minimum coolant temperature is usually lower than the external temperature here.

In one preferred development, the fan rotational speed is determined by means of a characteristic diagram, which is embodied in such a way that when the coolant actual temperature approaches the minimum coolant temperature, i.e. when the difference between the two temperatures becomes smaller, the fan rotational speed is increased in order to avoid icing up of the surroundings cooler by heating the coolant by increasing the take up of heat from the surroundings.

Alternatively and preferably additionally the fan is actuated independently of the operating mode of the control system in that the fan rotational speed is set in accordance with the coolant actual temperature in such a way that when heat is discharged via the surroundings cooler and when the coolant actual temperature rises a relatively high fan rotational speed is set in order to cool the correspondingly warmer coolant in the surroundings cooler to a greater extent.

In the excess mode of the cooling circuit, i.e. when the excess heat is stored in the cooling circuit, the control of the fan is expediently dispensed with and for this purpose said fan is deactivated, since an exchange of heat with the surroundings is not desired in this case. By deactivating the fan, correspondingly both energy is saved for the operation of the fan and heat is saved to be taken up via the heat pump in order to heat the passenger compartment.

By means of the control concept for the fan which is described above the throughput of air at the surroundings cooler is controlled in a way which is particularly adapted to demand, and is as a result particularly efficient. The fan rotational speed is increased only when there is a corresponding demand, and otherwise is kept as low as possible or even switched off so that overall improved acoustics of the heating system are also achieved. A plurality of or all of the above specified concepts for actuating the fan are preferably implemented and linked via a maximum selection. The highest fan rotational speed is selected in so far as it is permitted by the operating mode, i.e. in so far as the fan is not switched off overall in the cooling circuit owing to the excess mode in order to store the excess heat. As a result, icing up of the surroundings cooler for a drop in coolant actual temperature is prevented by an increased take up of heat from the surroundings, and when the coolant actual temperature is rising excess heating of the coolant is prevented by the fact that more heat is output to the surroundings.

The outputting of heat via the surroundings cooler is alternatively or additionally controlled by means of the cooling circuit pump in the cooling circuit or by means of one or more air flaps in the air path of the surroundings cooler. The cooling circuit pump is operated at a given time with a specific, adjustable pump rotational speed so that in this way the volume flow of the coolant through the surroundings cooler and therefore the exchange of heat with the surroundings is controlled. Similarly, the volume flow of the surrounding air is expediently controlled by means of the air flaps on the airside of the surroundings cooler. For this purpose, the air flaps have an adjustable degree of opening of the flaps, which indicates how far the air flaps are opened or closed. The air flaps or the cooling circuit pump or both are preferably actuated separately by the fan, in order to achieve particularly optimum temperature control and to control the discharge and storage of heat in accordance with the situation and according to demand.

Refinements arise particularly advantageously through the application of one or more of the concepts for actuating the fan to the cooling circuit pump or to the air flaps or to both. It is essential here, in particular, that the fan, the cooling circuit pump and the air flaps are respectively activated independently of one another by the control system in an optimum way and according to demand.

In one advantageous refinement, the control system is embodied in such a way that in the heating mode the pump rotational speed of the cooling circuit pump is set in the cooling circuit of the heating system in accordance with a coolant actual temperature and a minimum coolant temperature, and that in the cooling mode the pump rotational speed of the cooling circuit pump is set in accordance with the coolant actual temperature. This control of the cooling circuit pump is expediently carried out also when the heat pump is active for the purpose of transferring heat from a vehicle component or from the surroundings into the heating circuit in order to set the coolant volume flow at the chiller in an optimal way for this purpose. Correspondingly, for this purpose in particular a characteristic diagram, by means of which the cooling circuit pump is actuated in accordance with the coolant actual temperature, is also used in the heating mode.

In a further advantageous refinement, the control system is embodied in such a way that in the heating mode a degree of opening of one or more air flaps of the heating system are/is set in accordance with a coolant actual temperature and a minimum coolant temperature, and that in the cooling mode the degree of opening of the air flaps is set in accordance with the coolant actual temperature.

The input parameters for controlling the fan, the cooling circuit pump and the air flaps are advantageously here the same, specifically the coolant actual temperature, the minimum coolant temperature and the external temperature. However, in one advantageous refinement the interpretation of these parameters is adapted by separate and individual characteristic diagrams respectively for the fan, the coolant pump and the air flaps to the respective components. In a way analogous to the fan rotational speed, in the cooling circuit pump the pump rotational speed is increased in order to generate more throughput of coolant at the surroundings cooler and to bring about more exchange of heat with the surroundings. In the case of the air flaps, in a way which is analogous to the fan rotational speed, a degree of opening of the flaps of the air flaps is set, wherein the degree of ventilation is increased, in order to generate more throughput of air at the surroundings cooler and to bring about more exchange of heat with the surroundings. The heating system is operated particularly efficiently by virtue of this separate and situation-dependent actuation of the fan, of the cooling circuit pump and of the air flaps.

Connected to the refrigeration circuit is also a compressor which is operated at a specific compressor rotational speed and correspondingly generates a specific refrigeration capacity which also determines the capacity of the heat pump, in so far as the latter is active. In one preferred refinement, the control system has at least one closed-loop controller by means of which the compressor, in particular the capacity thereof, is regulated by closed loop control of the compressor rotational speed. In the heating mode, in particular the heating circuit actual temperature is used as a closed loop control variable. The heating circuit setpoint temperature, which is set, for example, by the user by means of an operator control element, serves as the guide variable. For any such closed-loop control process of the compressor in the heating mode, there is generally an increase and decrease in the actuation of the compressor, and therefore a changing compressor rotational speed, in the region of the heating circuit setpoint temperature. If a permissible minimum rotational speed which is not to be undershot is achieved for the compressor, there is usually intermittent operation of the compressor. When the heating circuit setpoint temperature is exceeded, the compressor is then deactivated since no further heat is required in the heating circuit but the compressor rotational speed cannot be reduced anymore. When it is undershot, the compressor is then activated again in order to transfer the necessary heat in to the heating circuit. As a result, the compressor is operated in a clocked fashion. However, the activation of the compressor is subject, in particular, to inertia such that when activation occurs there is not yet any power available, or not the full power, but the heating circuit actual temperature has already undershot the heating circuit setpoint temperature, i.e. there is a heating deficit in the heating circuit. A heating deficit arises, in particular, also when the compressor is first activated after relatively long deactivation, e.g. when the vehicle starts. In such a situation, the saturation temperature of the coolant is under certain circumstances lower than the temperature of the coolant in the condenser, so that the refrigerant in the condenser evaporates and heat is disadvantageously extracted from the heating circuit. In so far as an additional heater is arranged in the heating circuit, it is, if appropriate, activated by the heating deficit in order to feed in the required heat. However this is less efficient than using the heat pump.

Therefore, the control system is preferably embodied in such a way that in the heating mode the compressor of the heating system is activated predictively even before the heating circuit actual temperature undershoots the heating circuit setpoint temperature, in order to avoid a heat deficit, i.e. here to avoid a heating deficit, or in order to avoid activation of an additional heater in the heating circuit, which would otherwise be activated in order to avoid a heating deficit. Accordingly, the compressor effectively generates excess heat which is then used for heating directly afterwards. As it were a heating request is anticipated without said request already being present. However, it is determined from the heating circuit actual temperature and the heating circuit setpoint temperature that in future additional heat will be required, which heat is then correspondingly produced in advance, in order to avoid a heating deficit or in order to avoid any need for heating. In one suitable refinement, an offset is added to the heating circuit actual temperature for the purpose of predictive activation, so that the closed loop control process for the compressor activates it prematurely. The predictive actuation of the compressor therefore intervenes effectively in the closed loop control process of the compressor and modifies it in order to ensure more efficient heating of the passenger compartment. The offset is particularly negative to bring about, considered in terms of timing, earlier undershooting of the heating circuit setpoint temperature. The addition of a positive offset to the heating circuit setpoint temperature is equivalent to this. In one refinement which is also suitable, alternatively or additionally a temporal development of the heating circuit actual temperature is determined, i.e. it is determined whether it is rising or falling, e.g. in that a derivation of the heating circuit actual temperature is calculated. If the heating circuit actual temperature is higher than the heating circuit setpoint temperature and at the same time falling, the compressor is expediently activated.

In the cooling mode and in the mixed mode, in which modes the air-conditioning evaporator is respectively active and is used to take up heat into the refrigeration circuit, the compressor is advantageously regulated in accordance with an evaporator actual temperature as a closed loop control variable, i.e. in particular in accordance with that temperature which is present on the airside of the air-conditioning evaporator. An evaporator setpoint temperature, which analogously constitutes a target temperature of the air-conditioning evaporator or a target temperature for the air and is set, for example, by the user, is used as a guide variable.

The control system is connected to the heating system in particular in order to control it. This is understood as meaning, in particular, that the control system manipulates and sets the heating system by means of a number of actuators. In addition, the term "control system" is also to be understood as meaning a closed-loop control system or open-loop and closed-loop control system, i.e. the control system is not configured exclusively for open-loop control but rather can, if appropriate, also be used for closed-loop control. The control system suitably has control electronics or a controller in order, in particular, to carry out one or more of the abovementioned settings, open-loop control processes, closed-loop control processes, calculations and/or other operations.

In the open-loop and closed-loop control concepts described above for the various components, the various characteristic diagrams are considered to be particularly important, said diagrams being used, on the one hand, to determine further parameters for the respective open-loop or closed-loop control and, on the other hand, to produce a reference to the various control variables. The characteristic diagrams are determined, in particular, by means of suitable trials and are suitably stored as a value table or a calculation rule in a memory of the control system.

The described developments are also already advantageous in themselves and without combination with the feature "that the mixed mode is activated if the excess heat in the heating circuit exceeds a threshold value which is determined in accordance with the external temperature".

In the method for operating a heating system of an electric vehicle or hybrid vehicle, the heating system is controlled by means of a control system as described above. The object is also achieved, in particular, by means of an electric vehicle or hybrid vehicle having a control system as described above. The object is also achieved, in particular, by the use of a control system as described in an electric vehicle or hybrid vehicle. An electric vehicle or hybrid vehicle is distinguished by the fact that it has a high-voltage accumulator for its drive. The high-voltage accumulator is also referred to as an energy store or as a battery. The described control system is suited particularly for an electric vehicle or hybrid vehicle having a high-voltage accumulator which is cooled with a coolant and which is connected to an HVAC circuit as part of the overall cooling circuit, wherein at the same time the chiller of the heat pump is also connected in the HVAC circuit, so that the high-voltage accumulator is cooled by means of the heat pump according to demand.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
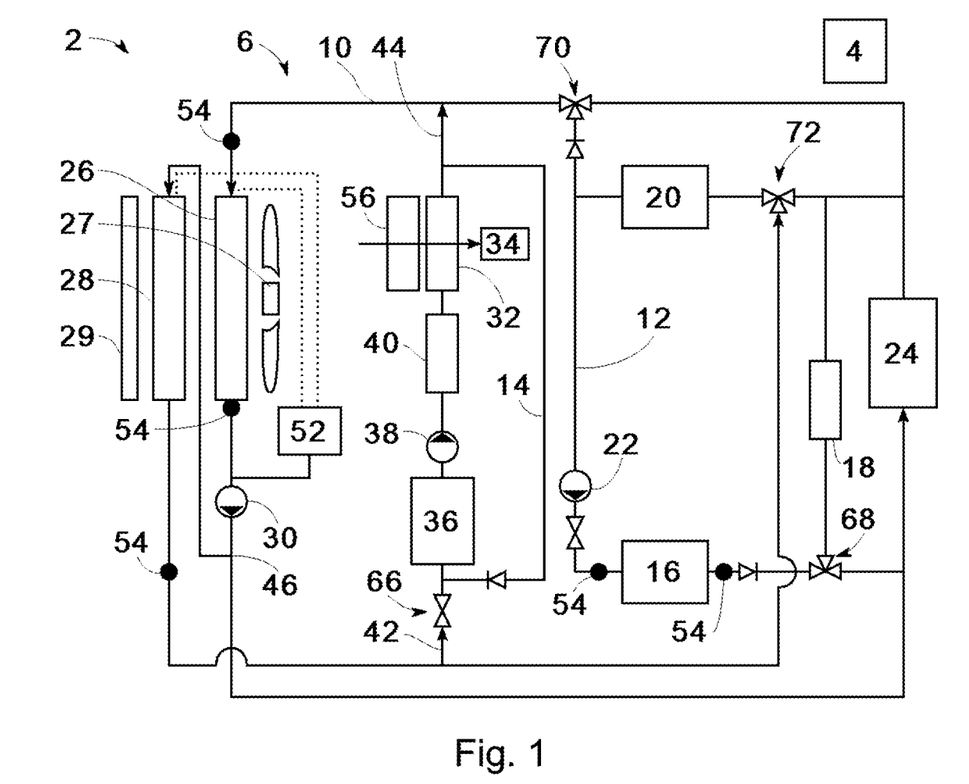
FIG. 1 is a schematic diagram showing a heating system and a control system.
Figure 2:
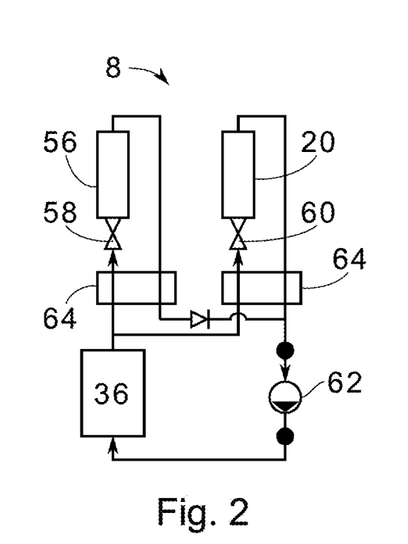
FIG. 2 shows a refrigeration circuit of the heating system.
Figure 3:
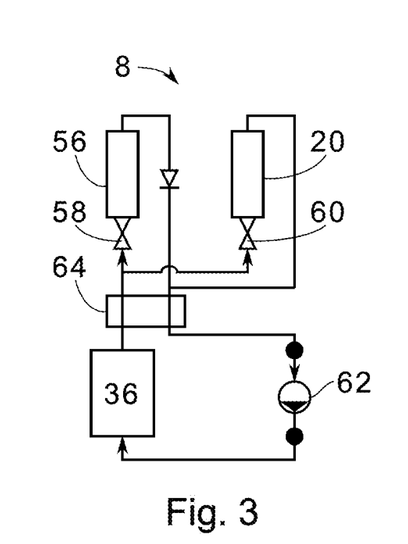
FIG. 3 shows a variant of the refrigeration circuit.

FIG. 1 shows a heating system 2 and a control system 4 for controlling various components of the heating system 2. The heating system 2 is designed for use in an electric vehicle or hybrid vehicle (not shown in more detail) which is also referred to merely as a vehicle. The heating system 2 has an overall cooling circuit 6 and a refrigeration circuit 8, which is not illustrated in FIG. 1. Two variants of the refrigeration circuit 8 are shown in FIGS. 2 and 3. The heating system 2 in FIG. 1 illustrates a preferred embodiment, but the aspects which are described below, specifically with respect to the interconnection of two respective components to one another, can also be applied individually.

The overall cooling circuit 6 has a plurality of circuits 10, 12, 14, specifically a cooling circuit 10, an HVAC circuit 12 and a heating circuit 14. A high-voltage accumulator 16 is connected to the HVAC circuit 12 in order to supply an electric drive train of the electric vehicle or hybrid vehicle. Furthermore, an HVAC additional heater 18 is connected to the HVAC circuit 12. Furthermore, a chiller 20 is connected to the HVAC circuit 12 and is also connected to the refrigeration circuit 8. Furthermore, an HVAC centrifugal pump 22 is arranged in the HVAC circuit 12, in order to circulate coolant.

A heat source 24 of the vehicle is connected to the cooling circuit 10. The heat source 24 is, for example, an electric machine of the vehicle or a power electronics system or a charging electronics system. Downstream of the heat source 24 a first surroundings cooler 26 is connected to the cooling circuit 8 in order to exchange heat with the surroundings. A fan 27 is arranged downstream of the first surroundings cooler 26 in a surroundings air path. The first surroundings cooler 26 is combined in the exemplary embodiment shown with a second surroundings cooler 28 to form a cooler package. However, basically a refinement without the second surroundings cooler 28 is also possible. One or more air flaps 29 are arranged in the surroundings air path upstream of the two surroundings coolers 26, 28 in order to control the supply of air to the surroundings coolers 26, 28. The exchange of heat with the surroundings can therefore be set by actuating the fan 27 and the air flaps 29. Furthermore, a cooling circuit pump 30 is arranged in the cooling circuit 10, here downstream of the first surroundings cooler 26 and upstream of the heat source 24.

The heating circuit 14 serves to control the temperature of the passenger compartment. A heating heat exchanger 32 is connected to the heating circuit 14 in order to heat passenger air for a passenger compartment 34 of the vehicle. Furthermore, a condenser 36 is connected to the heating circuit 14 and also connected to the refrigeration circuit 8 and forms together with the chiller 20 a heat pump which is designed to transfer heat from the chiller 20 into the heating circuit 14. Furthermore, a heating circuit pump 38 and an additional heater 40 are arranged in the heating circuit 14. In the exemplary embodiment shown, the condenser 36, the heating circuit pump 38, the additional heater 40 and the heating heat exchanger 32 are arranged in the specified sequence downstream of one another on a main branch of the heating circuit 14. The heating circuit 14 is connected to the cooling circuit 10 via a heating circuit feedline 42 and a heating circuit return line 44 in such a way that the main branch and the components connected thereto are arranged in series with the first surroundings cooler 26.

The HVAC circuit 12 is also connected to the cooling circuit 8, but not to the heating circuit 14. The HVAC circuit 12 is connected upstream and downstream of the heat source 24 and downstream of the chiller 20. As a result, a series connection or a parallel connection of the high-voltage accumulator 16 and the heat source 24 is optionally possible and is also set given corresponding demand.

The heating system 2 also has a compensation volume 52 for the coolant. Furthermore, a number of temperature sensors 54 are arranged in the overall cooling circuit 6 in order to measure the temperature of the coolant.

In order to control the temperature of the passenger compartment, the heating system 2 has an air-conditioning evaporator 56 which is connected to the refrigeration circuit 8. As is shown in FIGS. 2 and 3, the air-conditioning evaporator 56 is connected parallel to the chiller 20 in the refrigeration circuit 8. In order to set the cooling capacity of the air-conditioning evaporator 56, an expansion valve 58 is connected upstream thereof. An expansion valve 60 is also connected upstream of the chiller 20. The heating heat exchanger 32 and the air-conditioning evaporator 56 are together part of an air-conditioning device by means of which the passenger compartment 34 is heated, cooled and also dehumidified. The refrigeration circuit 8 in FIG. 2 additionally has two internal heat exchangers 64, in each case one for the air-conditioning evaporator 56 and one for the chiller 20. In the variant in FIG. 3, just one internal heat exchanger 64 is arranged for both evaporators. In a variant which is not shown no internal heat exchanger 64 is present.

In order to switch over the heating system 2 between various switched states and in order to set various operating modes various actuators, here valves 66, 68, 70, 72 are arranged in the overall cooling circuit 6. A shut-off valve 66 in the heating circuit feedline 42 serves to shut off the heating circuit 14, that is to say to open or close it. Alternatively, the shut-off valve 66 is arranged in the heating circuit return line 44. Furthermore, three 3/2-way valves 68, 70, 72 are arranged, said valves permitting, depending on the switched position, various series connections and parallel connections of the first surroundings cooler 26, chiller 20, heat source 24 and high-voltage accumulator 16. The heating circuit 14 can be shut off independently thereof in each case.

The control system 4 is embodied in such a way that when there is a heating request for a passenger compartment 34 of the vehicle a heating mode is set in order to heat the passenger compartment by means of heat from the heating circuit 14. In a mixed mode, excess heat dT in the heating circuit 14 is output to the surroundings via the surroundings coolers 26, 28 in the cooling circuit 10 or in an excess mode it is retained in the heating system 2 in order to satisfy a future heating request. In the mixed mode, a degree of opening of the heating circuit 14 is set in such a way that only a partial quantity of coolant from the heating circuit 14 is exchanged with the cooling circuit 10, as a result the excess heat dT is output to the surroundings. In contrast, the remaining part of the coolant circulates in the heating circuit 14 and serves, in particular, to heat the passenger compartment. The degree of opening is set in the exemplary embodiment shown by a clocking system of the shut-off valve 66. The mixed mode is activated if the excess heat in the heating circuit 14 exceeds a threshold value S1 which is determined in accordance with the external temperature Ta. This relationship is explained in more detail below with reference to FIG. 4.

The excess heat dT is therefore not necessarily automatically discharged in the heating system 2 but rather, if appropriate, stored, specifically in the coolant, in a way which is adapted to the situation. This is done here by taking into account the external temperature Ta in the decision as to whether or not the excess heat dT is discharged from the heating circuit 14 to the surroundings by means of the mixed mode, and instead is retained in the heating system 2 in the excess mode.

In the mixed mode, the heating circuit 14 is only partially opened and is operated in a clocked fashion here by means of the shut-off valve 66, to discharge the excess heat dT from the heating circuit 14 in the mixed mode. As a result of the recurring opening and closing, sometimes heat is retained in the heating circuit 14 in order to heat the passenger compartment, and sometimes heat is output into the cooling circuit 10 in order to be output to the surroundings. The mixed mode is set as a result of the fact that the shut-off valve 66 is opened and closed periodically. In a variant which is not shown but is equivalent, instead of the shut-off valve 66 a proportional valve with a variant flow cross section is used.

The excess mode serves to retain heat, and this can be implemented in different ways. For example, the heating circuit 14 is, as in the pure heating mode, continuously closed and the heat is stored in the heating circuit 14. Alternatively or additionally, the supply of surroundings air to the surroundings coolers 26, 28 is interrupted by means of the air flaps 29 so that heat is not exchanged with the surroundings. Alternatively or additionally, the supply of coolant to the surroundings coolers 26, 28 is stopped, e.g. in that the cooling circuit pump 30 is deactivated or its pump rotational speed PD is reduced. The heat is alternatively or additionally stored in the cooling circuit 10.

Figure 4:
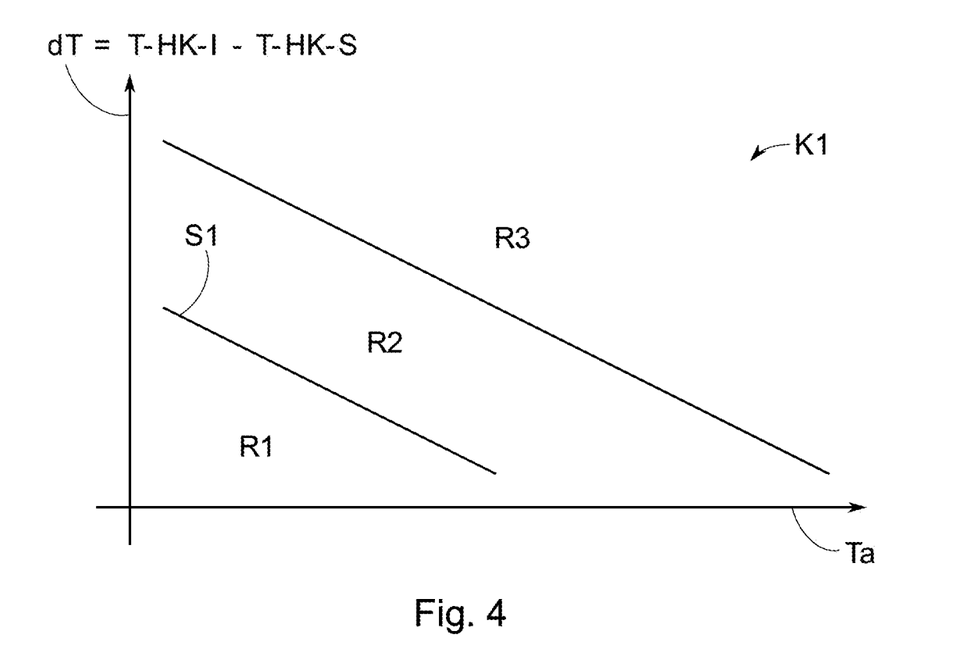
FIG. 4 is a characteristic diagram for controlling a heating circuit of the heating system.

FIG. 4 shows a characteristic diagram K1 for controlling the heating circuit 14, i.e. for determining and setting the degree of opening. The characteristic diagram K1 shows three regions R1, R2, R3 which predefine the degree of opening in accordance with the external temperature Ta and the excess heat dT and contain the latter, for example, directly as a value. The excess heat dT corresponds here to the difference between a heating circuit actual temperature T-HK-I of the coolant in the heating circuit 14 and a heating circuit setpoint temperature T-HK-S. In the region R1 the heating circuit 14 is closed, in the region R2 the mixed mode is set, and in the region R3 the heating circuit 14 is completely open, i.e. the degree of opening is set to a maximum value. On the basis of the heating mode in the region R1, the mixed mode is activated in the region R2 if the threshold value S1 for the current excess heat dT is exceeded. The heating circuit 14 is then partially opened, i.e. the maximum possible degree of opening is not set but rather part of the heat continues to be used to heat the passenger compartment. As the external temperature Ta rises here, the threshold value S1 becomes lower. As a result of this dependence on the external temperature Ta, the start of the opening of the heating circuit 14 shifts, so that in corresponding cases premature discharging of heat is prevented. Correspondingly, the mixed mode is also prevented, with positive consequences for the acoustic behavior and the wear of the heating system 2. Within the region R2, the degree of opening is increased further as the excess heat dT in the heating circuit 14 increases. In the case of a further increase in the excess heat dT, the region R3 is then reached and a cooling mode is automatically set and the heating circuit 14 is opened to the maximum extent. The degree of opening is correspondingly set to a maximum value.

If neither the heating mode nor the cooling mode is activated, the heating circuit 14 is closed in accordance with the heating circuit actual temperature T-HK-I if the heating circuit actual temperature T-HK-I is higher than the external temperature Ta, and opened if the heating circuit actual temperature T-HK-I is lower than the external temperature Ta or corresponds to it.

Furthermore, the control according to characteristic diagram K1 for FIG. 4 is modified here in certain situations by means of a further control concept and the determined degree of opening is, if appropriate, overwritten. Therefore, the heating circuit 14 is continuously opened here if the heating circuit setpoint temperature T-HK-S is lower than the coolant actual temperature T-KM-I upstream of the heating circuit 14. As a result, an excess mode is set, which overwrites the degree of opening which is determined for the heating mode or for the mixed mode from the regions R1, R2 and sets it to its maximum value.

Figure 5:
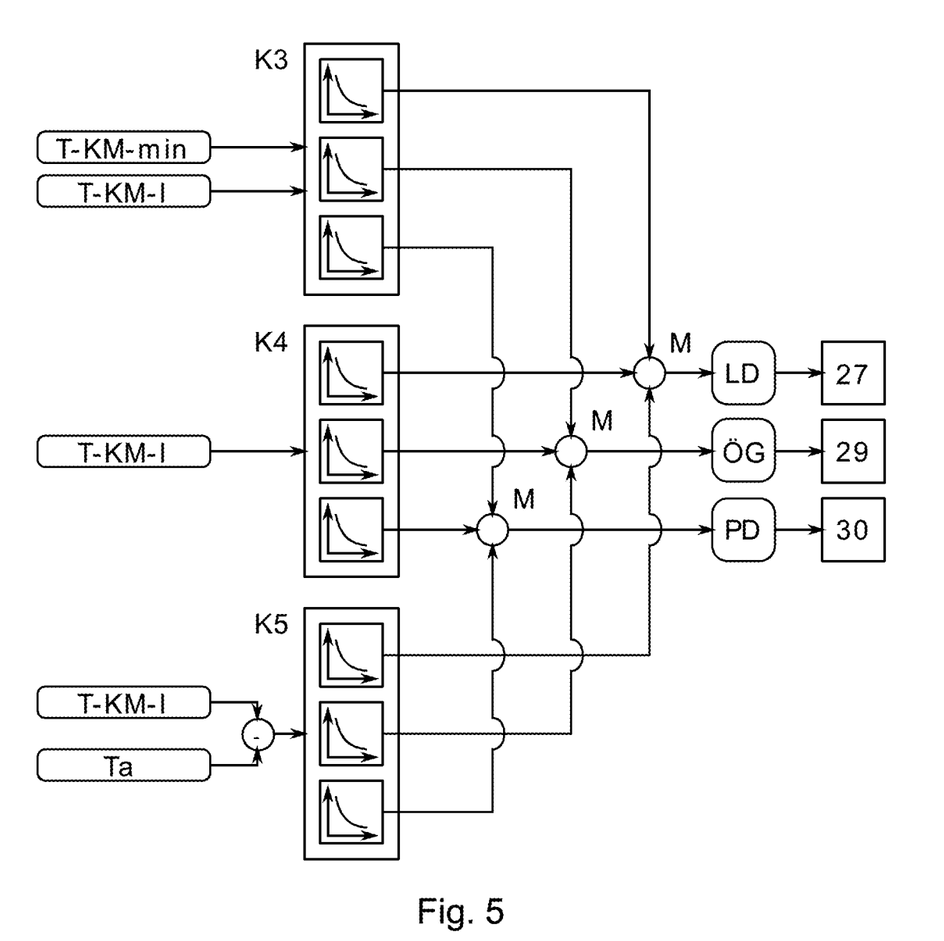
FIG. 5 shows control concepts for a fan, air flaps and a cooling circuit pump.

FIG. 5 now shows control concepts for the fan 27, the air flaps 29 and the cooling circuit pump 30. The fan 27 has an adjustable fan rotational speed LD. This is set in the heating mode in accordance with a coolant actual temperature T-KM-I and a minimum coolant temperature T-KM-min. The minimum coolant temperature T-KM-min specifies a lower limiting value which prevents the coolant at the surroundings coolers 26, 28 from being cooled to such an extent that the latter ice up. For this purpose, the minimum coolant temperature T-KM-min is determined e.g. by means of a characteristic diagram (not shown) in accordance with the external temperature Ta. In the cooling mode, the fan rotational speed LD is set in accordance with the coolant actual temperature T-KM-I by means of corresponding characteristic diagrams K2, K3, K4, in such a way that when heat is discharged via the surroundings coolers 26, 28 and when the coolant actual temperature T-KM-I rises, a higher fan rotational speed LD is set in order to cool the correspondingly warmer coolant to a greater extent. In the excess mode of the cooling circuit, control of the fan 27 is dispensed with and for this purpose, it is deactivated, since an exchange of heat with the surroundings is not desired in this case. The specified concepts for actuating the fan 27 are in parallel with respect to one another, as is clarified in FIG. 5, and are linked via a maximum selection M which selects the respective highest fan rotational speed LD.

As shown in FIG. 5, the control concepts for the fan 27 are applied analogously here also to the air flaps 29 and the cooling circuit pump 30, but in each case with separate individual characteristic diagrams K2, K3, K4. The air flaps 29 are actuated here by means of a degree of opening which indicates how far the air flaps 29 are opened or closed. The cooling circuit pump 30 is actuated by means of a pump rotational speed PD. The input parameters for controlling the fan 27, the cooling circuit pump 30 and the air flaps 29 are accordingly the same. The interpretation of these parameters is, however, adapted to the respective component by means of separate and individual characteristic diagrams K2, K3, K4.

Figure 6:
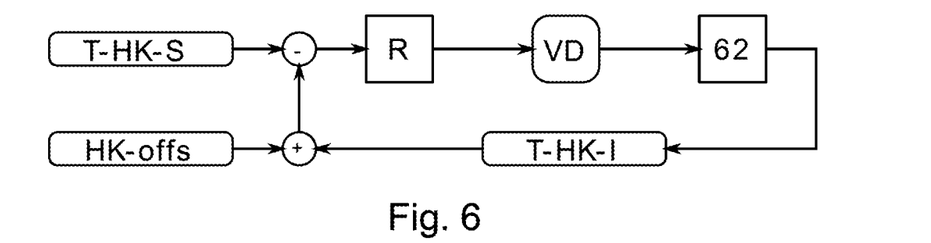
FIG. 6 shows a control concept for a compressor.

The compressor 62 in the refrigeration circuit 8 is operated with a specific compressor rotational speed VD and then generates a corresponding refrigeration capacity. FIG. 6 shows a closed-loop control concept with a closed-loop controller R, by means of which the capacity of the compressor 62 is subjected to closed-loop control in that the compressor rotational speed VD is subjected to closed-loop control. In the heating mode, closed-loop control in which the heating circuit actual temperature T-HK-I is used as closed-loop control variable is carried out by means of the control system 4. The heating circuit setpoint temperature T-HK-S is used as a guide variable for the closed-loop control, as shown in FIG. 6. During such closed-loop control of the compressor 62, intermittent operation of the compressor 62 usually then occurs in the region of the heating circuit setpoint temperature T-HK-S, since said compressor 62 is deactivated when the heating circuit setpoint temperature T-HK-S is exceeded if it is at its minimum permissible compressor rotational speed VD, and is activated again when subsequent undershooting occurs. In order to avoid a heating deficit owing to this clocking sequence of the compressor 62, the compressor 62 is predictively activated even before the heating circuit actual temperature T-HK-I undershoots the heating circuit setpoint temperature T-HK-S. For this purpose, in the exemplary embodiment in FIG. 6 an offset HK-offs is added to the heating circuit actual temperature T-HK-I, with the result that the closed-loop controller R for the compressor 62 activates said compressor prematurely. The predictive actuation then intervenes effectively in the closed-loop control of the compressor 62.

LIST OF REFERENCE SYMBOLS

2 Heating system
4 Control system
6 Overall cooling circuit
8 Refrigeration circuit
10 Cooling circuit
12 HVAC circuit
14 Heating circuit
16 High-voltage accumulator
18 HVAC additional heater
20 Chiller
22 HVAC centrifugal pump
24 Heat source
26 First surroundings cooler
27 Fan
28 Second surroundings cooler
29 Air flaps
30 Cooling circuit pump
32 Heating-type heat exchanger
34 Passenger compartment
36 Condenser
38 Heating circuit pump
40 Additional heater
42 Heating circuit feedline
44 Heating circuit return line
46 Cooler branch
52 Compensation volume
54 Temperature sensor
56 Air-conditioning evaporator
58 Expansion valve (of the air-conditioning evaporator)
60 Expansion valve (of the chiller)
62 Compressor
64 Internal heat exchanger
66 Shut-off valve
68 3/2-way valve
70 3/2-way valve
72 3/2-way valve
dT Excess heat
HK-offs Offset
K1-K4 Characteristic diagram
M Maximum selection
ÖG Degree of opening of flaps
PD Pump rotational speed
R Closed-loop controller
R1,R2,R3 Region
S1 Threshold value
Ta External temperature
T-HK-I Heating circuit actual temperature
T-HK-S Heating circuit setpoint temperature
T-KM-I Coolant actual temperature
VD Compressor rotational speed The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for a heating system of an electric vehicle or hybrid vehicle, comprising:
a control system configured to execute a process such that:
when there is a heating request for a passenger compartment of the vehicle, a heating mode is set in order to heat the passenger compartment by heat from a heating circuit,
in a mixed mode, an excess heat in the heating circuit is output to surroundings via a surroundings cooler in a cooling circuit, or in an excess mode the excess heat is retained in the heating system, in order to satisfy a heating request,
in the mixed mode, a degree of opening of the heating circuit is set in such a way that only a partial quantity of coolant from the heating circuit is exchanged with the cooling circuit and as a result the excess heat is output to the surroundings,
the mixed mode is activated if the excess heat in the heating circuit exceeds a threshold value which is determined in accordance with an external temperature.

2. The system according to claim 1, wherein the control system is further configured such that:
the threshold value becomes lower as the external temperature rises.

3. The system according to claim 1, wherein the control system is further configured such that:
in the mixed mode, the degree of opening is increased as the excess heat in the heating circuit increases.

4. The system according to claim 1, wherein the control system is further configured such that:
the degree of opening is determined as a function of the external temperature and the excess heat on the basis of a characteristic diagram.

5. The system according to claim 1, wherein the control system is further configured such that:

the excess heat is determined on the basis of a difference between a heating circuit actual temperature of the coolant in the heating circuit and a heating circuit setpoint temperature or corresponds to this difference.

6. The system according to claim 1, wherein the control system is further configured such that:
in the excess mode, the excess heat is retained in the heating circuit, in order to satisfy the heating request from the heating circuit.

7. The system according to claim 1, wherein the control system is further configured such that:
in the excess mode, the excess heat is retained in the cooling circuit, and in order to satisfy the future heating request it is transferred from the cooling circuit into the heating circuit by a heat pump of the heating system.

8. The system according to claim 1, wherein the control system is further configured such that:
in the heating mode, the heating circuit is opened if a heating circuit setpoint temperature is lower than a coolant actual temperature upstream of the heating circuit.

9. The system according to claim 1, wherein the control system is further configured such that:
if neither the heating mode nor a cooling mode is activated, the heating circuit is closed in accordance with a heating circuit actual temperature if the heating circuit actual temperature is higher than the external temperature, and is opened if the heating circuit actual temperature is lower than the external temperature or corresponds thereto.

10. The system according to claim 1, wherein the control system is further configured such that:
in the heating mode, a fan rotational speed of a fan of the heating system is set in accordance with a coolant actual temperature and a minimum coolant temperature, and
in a cooling mode, the fan rotational speed of the fan is set in accordance with the coolant actual temperature.

11. The system according to claim 1, wherein the control system is further configured such that:
in the heating mode, a pump rotational speed of a cooling circuit pump is set in a cooling circuit of the heating system in accordance with a coolant actual temperature and a minimum coolant temperature, and
in a cooling mode, the pump rotational speed of the cooling circuit pump is set in accordance with the coolant actual temperature.

12. The system according to claim 1, wherein the control system is further configured such that:
in the heating mode, a degree of opening of one or more air flaps of the heating system are/is set in accordance with a coolant actual temperature and a minimum coolant temperature, and
in a cooling mode, the degree of opening of the one or more air flaps is set in accordance with the coolant actual temperature.

13. The system according to claim 1, wherein the control system is further configured such that:
in the heating mode, a compressor of the heating system is activated predictively even before a heating circuit actual temperature undershoots a heating circuit setpoint temperature, in order to avoid a heat deficit or in order to avoid activation of an additional heater in the heating circuit.

14. A method for operating a heating system via a control system, the method comprising the steps of:
making a heating request for a passenger compartment of the vehicle and in response to the heating request a heating mode is set in order to heat the passenger compartment by heat from a heating circuit;
in a mixed mode, an excess heat in the heating circuit is output to surroundings via a surroundings cooler in a cooling circuit, or in an excess mode the excess heat is retained in the heating system, in order to satisfy a heating request;
in the mixed mode, a degree of opening of the heating circuit is set in such a way that only a partial quantity of coolant from the heating circuit is exchanged with the cooling circuit and as a result the excess heat is output to the surroundings; and
the mixed mode is activated if the excess heat in the heating circuit exceeds a threshold value which is determined in accordance with an external temperature.

* * * * *